(12) United States Patent
Lewis et al.

(10) Patent No.: US 8,397,701 B2
(45) Date of Patent: Mar. 19, 2013

(54) FUEL SYSTEM FOR MULTI-FUEL ENGINE

(75) Inventors: Donald J. Lewis, Howell, MI (US);
Thomas G. Leone, Ypsilanti, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 1266 days.

(21) Appl. No.: 12/184,064

(22) Filed: Jul. 31, 2008

(65) Prior Publication Data

US 2010/0024772 A1 Feb. 4, 2010

(51) Int. Cl.
*F02M 57/02* (2006.01)
*F02M 43/00* (2006.01)
*F02B 13/00* (2006.01)

(52) U.S. Cl. ............. 123/575; 123/1 A; 123/3; 123/304; 123/299; 123/446

(58) Field of Classification Search .................. 123/1 A, 123/3, 299, 305, 304, 446, 495, 557, 575; 701/103
See application file for complete search history.

(56) References Cited

U.S. PATENT DOCUMENTS

| | | | |
|---|---|---|---|
| 4,402,296 A | 9/1983 | Schwarz | |
| 4,705,010 A * | 11/1987 | Baranescu | 123/575 |
| 4,911,116 A | 3/1990 | Prohaska et al. | |
| 5,097,803 A | 3/1992 | Galvin | |
| 5,193,508 A * | 3/1993 | Motoyama et al. | 123/460 |
| 5,195,466 A | 3/1993 | Schulte et al. | |
| 5,336,396 A | 8/1994 | Shetley | |
| 6,289,884 B1 * | 9/2001 | Blandino et al. | 123/585 |
| 6,467,470 B1 | 10/2002 | Carlsson et al. | |
| 6,622,663 B2 * | 9/2003 | Weissman et al. | 123/1 A |
| 6,622,664 B2 * | 9/2003 | Holder et al. | 123/3 |
| 6,711,893 B2 * | 3/2004 | Ueda et al. | 60/285 |
| 7,013,873 B2 | 3/2006 | Oomori | |
| 7,028,672 B2 * | 4/2006 | Glenz et al. | 123/514 |
| 7,107,942 B2 * | 9/2006 | Weissman et al. | 123/1 A |
| 7,159,568 B1 | 1/2007 | Lewis et al. | |
| 7,225,787 B2 | 6/2007 | Bromberg et al. | |
| 7,334,569 B2 | 2/2008 | Kobayashi | |
| 7,357,101 B2 * | 4/2008 | Boyarski | 123/1 A |
| 7,444,987 B2 * | 11/2008 | Cohn et al. | 123/431 |
| 7,448,348 B2 * | 11/2008 | Shinagawa et al. | 123/3 |
| 7,661,414 B2 * | 2/2010 | Kamio | 123/557 |
| 7,720,592 B2 * | 5/2010 | Leone et al. | 701/103 |

(Continued)

FOREIGN PATENT DOCUMENTS

DE  2550722  5/1977

OTHER PUBLICATIONS

Unknown Author, "Honda Making Significant Progress on HCCI Engine for Hybrid Application," http://www.greencarcongress.com/2005/10/honda_making_si.html, Oct. 28, 2005, 8 pages
Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL., Oct. 29-Nov. 1, 2007, 12 pages.

(Continued)

*Primary Examiner* — Noah Kamen
*Assistant Examiner* — Tea Holbrook
(74) *Attorney, Agent, or Firm* — Julia Voutyras; Alleman Hall McCoy Russell & Tuttle LLP (57) ABSTRACT

A fuel system and a method of operation of the fuel system are described in the context of a multi-fuel internal combustion engine. In one example, the method includes varying a proportion of fuel supplied by a fuel pump to an engine and a fuel separator. The method may be particularly useful for a dual fuel engine.

20 Claims, 7 Drawing Sheets

U.S. PATENT DOCUMENTS

| | | | |
|---|---|---|---|
| 7,770,562 B2 * | 8/2010 | Pursifull et al. | 123/446 |
| 7,802,562 B2 * | 9/2010 | Lippa et al. | 123/577 |
| 7,957,888 B2 * | 6/2011 | Leone et al. | 701/103 |
| 8,267,074 B2 * | 9/2012 | Leone et al. | 123/575 |
| 2005/0109316 A1 * | 5/2005 | Oda | 123/406.29 |
| 2007/0119422 A1 | 5/2007 | Lewis et al. | |
| 2007/0215127 A1 * | 9/2007 | Dearth et al. | 123/568.15 |
| 2009/0043479 A1 * | 2/2009 | Noda et al. | 701/103 |
| 2009/0065409 A1 | 3/2009 | Kamio et al. | |
| 2009/0095546 A1 | 4/2009 | Zubeck et al. | |
| 2009/0159057 A1 | 6/2009 | Pursifull et al. | |
| 2009/0178654 A1 | 7/2009 | Leone et al. | |
| 2009/0292442 A1 * | 11/2009 | Leone et al. | 701/103 |
| 2009/0292443 A1 * | 11/2009 | Stein et al. | 701/103 |

OTHER PUBLICATIONS

Leone, Thomas G. et al., "On Board Water Addition for Fuel Separation System," U.S. Appl. No. 12/117,167, filed May 8, 2008, 25 pages.

Bromberg, V. et al., "Calculations of Knock Suppressions in Highly Turbocharged Gasoline/Ethanol Engines Using Direct Ethanol Injection", Jul. 7, 2005, Massachusetts Institute of Technology.

Cohn, D.R. et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.

* cited by examiner

FUEL SYSTEM FOR MULTI-FUEL ENGINE

BACKGROUND AND SUMMARY

Fuel burning engines, such as internal combustion engines, may receive fuel via a fuel system. Some fuel systems may deliver fuel to the engine via port fuel injectors, whereby fuel is injected into an intake port of the engine. Other fuel systems may deliver fuel to the engine via direct fuel injectors, whereby fuel is injected directly into the cylinders of the engine.

Other fuel systems have been proposed that include both port fuel injectors and direct fuel injectors. For example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. are one example. The Heywood et al. papers describe directly injecting ethanol via direct fuel injectors in order to improve charge cooling effects, while also relying on port injected gasoline to provide the majority of combusted fuel over a drive cycle. The ethanol, in this example, may provide increased octane and increased charge cooling at the engine due to its higher heat of vaporization as compared with gasoline. As such, the ethanol may be used to reduce knock limits that may be otherwise imposed on engine boosting and compression ratio. This approach purports to increase engine fuel economy and increase utilization of renewable fuels, such as ethanol, by enabling the use of greater engine boosting and compression ratio with reduced engine knock.

Some fuel systems have been developed for use with the above described multi-fuel engines, whereby a fuel mixture comprising a blend of two or more fuels may be separated into two or more fuel components on-board the vehicle via a fuel separator. Fuel separation may be improved or increased, with some fuel separators, in proportion to a pressure difference applied across the fuel separator. For example, a rate at which a fuel separator separates a fuel mixture into two or more fuel components may be increased by increasing the pressure at which the fuel mixture is supplied to the fuel separator. As such, some fuel systems may utilize a separate fuel pump to pressurize the fuel mixture and thereby achieve a prescribed fuel separation rate at the fuel separator.

However, the inventors herein have recognized a disadvantage with this approach. For example, even though the fuel pump may be operated to enable or improve the fuel separation process, this additional fuel pump may reduce fuel efficiency of the engine, increase the complexity of the fuel system, and increase the cost of the fuel system.

As one approach, these and other issues may be addressed by a fuel system and a method of operating the fuel system. As a non-limiting example, the method includes: varying a composition of fuel supplied to an inlet of a fuel pump responsive to engine output; operating the fuel pump to provide pressurized fuel at an outlet of the fuel pump using the fuel received at the inlet of the fuel pump; supplying the pressurized fuel from the outlet of the fuel pump to the internal combustion engine and to a fuel separator; and varying a proportion of the pressurized fuel supplied to the internal combustion engine relative to the fuel separator responsive to the engine output. As a non-limiting example, during a lower engine output range, the fuel pump may supply fuel having a lower heat of vaporization (e.g. a fuel having a lower alcohol concentration) to the fuel separator; and during a higher engine output range the fuel pump may supply fuel having a higher heat of vaporization (e.g. a fuel having a higher alcohol concentration) to the engine via a direct injector. The amount of the fuel having the higher heat of vaporization that is supplied to the engine via the direct injector may be varied relative to an amount of the lower heat of vaporization fuel supplied to the engine via a port fuel injector in response to engine operating conditions.

In this way, at a first operating condition (e.g. at lower engine outputs) a fuel pump may be operated to provide a fuel mixture to the fuel separator at a suitable pressure for facilitating fuel separation; while at a second operating condition (e.g. at higher engine outputs), the same fuel pump may be operated to provide a fuel having a higher heat of vaporization to the engine. This higher heat of vaporization fuel may have been previously separated from the fuel mixture during a previous lower output operation of the engine. This approach enables the fuel system to perform multiple functions with the same fuel pump, thereby enabling a reduction in cost and complexity of the fuel system, as well as improving fuel efficiency of the engine.

DETAILED DESCRIPTION

Figure 1:
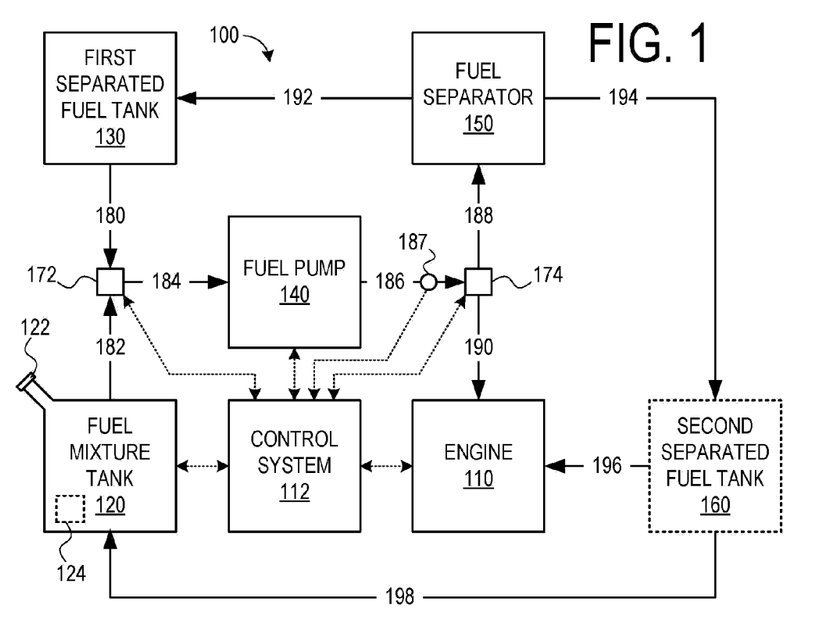
FIG. 1 illustrates an example fuel system for a fuel burning engine.

FIG. 1 illustrates an example fuel system 100 for a fuel burning engine 110. As a non-limiting example, fuel burning engine 110 may refer to an internal combustion engine for a vehicle and may include one or more combustion chambers or cylinders. An example cylinder of engine 110 is described in greater detail with reference to FIG. 2.

As described herein, fuel system 100 may be selectively operated to deliver a first fuel having a higher heat of vaporization (e.g. an alcohol rich fuel) to the engine via one or more direct fuel injectors forming a first injector group and a second fuel having a lower heat of vaporization (e.g. a gasoline rich fuel) may be delivered to the engine via one or more port fuel injectors forming a second injector group. The alcohol rich fuel as described herein refers to a fuel that includes a higher concentration of alcohol than the gasoline rich fuel. Conversely, the gasoline rich fuel as described herein refers to a fuel that includes a higher concentration of gasoline than the alcohol rich fuel. As a non-limiting example, the alcohol rich fuel may include alcohols such as ethanol, methanol, or may include other fuels with suitable properties which may not contain alcohol.

An amount of these fuels delivered to the engine via direct fuel injectors may be adjusted relative to an amount of these fuels delivered to the engine via the port fuel injectors based on engine output such as engine load or engine torque. As engine output increases, engine knock may be reduced by increasing the amount of fuel (in particular the alcohol rich fuel) that is delivered to the engine via the direct fuel injectors relative to the amount of fuel delivered to the engine via the port fuel injectors. At lower engine outputs, the amount of fuel delivered to the engine via the direct fuel injectors may be reduced relative to the amount of fuel delivered to the engine via the port fuel injectors. In this way, the alcohol rich fuel that is used for knock suppression may be used in lower proportion relative to the gasoline rich fuel at lower outputs, to conserve the alcohol rich fuel for later use at higher outputs when engine knock may be more likely to occur and where knock may be more severe.

Fuel system 100 may include one or more fuel storage tanks. For example, fuel system 100 may include a fuel mixture tank 120, a first separated fuel tank 130, and may optionally include a second separated fuel tank 160. As will be described in the context of gasoline and ethanol fuels, fuel mixture tank 120 may be configured to store a fuel mixture or fuel blend comprising both gasoline and ethanol, first separated fuel tank 130 may be configured to store an alcohol rich fuel such including ethanol that has been separated from the fuel mixture by a fuel separator 150, and second separated fuel tank 160 may be configured to store a gasoline rich fuel including gasoline that has been separated from the fuel mixture by fuel separator 150.

Fuel may be provided to fuel system 100 from a fuel source residing external the fuel system via fuel receptacle 122. For example, fuel receptacle 122 may be configured to receive a fuel nozzle (not shown). The fuel received at fuel mixture tank 120 via fuel receptacle 122 may include the fuel mixture comprising a mixture of gasoline and alcohol. As non-limiting example, the fuel mixture may include E10 (which comprises approximately 10% ethanol and 90% gasoline by volume), E85 (which comprises approximately 85% ethanol and 15% gasoline by volume), or other suitable mixture of gasoline and ethanol. In other examples, the fuel mixture may include gasoline and methanol or other suitable fuel. Fuel mixture tank may optionally include a fuel pump 124. Fuel pump 124 may be operated to supply fuel from fuel mixture tank 120 to one or more of the various other components of fuel system 100 as will be described in greater detail.

A first valve system 172 may fluidly couple fuel mixture tank 120 to fuel pump 140. In at least some embodiments, first valve system 172 may be disposed between a fuel pump inlet passage 184 of fuel pump 140 and first fuel supply passage 182 communicating with fuel mixture tank 120. First valve system 172 may also fluidly couple first separated fuel tank 130 to fuel pump 140. For example, first valve system 172 may be disposed between fuel pump inlet passage 184 and a second fuel supply passage 180 communicating with first separated fuel tank 130. In other embodiments, first valve system 172 may be omitted, where fuel pump 140 may receive fuel from only a single fuel source, such as one of fuel mixture tank 120 or first separated fuel tank 130.

As will be described in greater detail with reference to FIGS. 6 and 7, first valve system 172 may comprise one or more adjustable fuel valves. As a non-limiting example, first valve system 172 may comprise a three-way fuel control valve that couples fuel pump inlet passage 184 to first fuel supply passage 182 and second fuel supply passage 180. As another non-limiting example, first valve system 172 may comprise two or more separate or discrete fuel control valves, where a first fuel control valve fluidly couples first fuel supply passage 182 to fuel pump inlet passage 184 and a second fuel control valve fluidly couples second fuel supply passage 180 to fuel pump 184. In some embodiments, first valve system 172 may comprise a spool valve, an example of which is depicted in FIGS. 8A and 8B.

Regardless of the particular configuration of first valve system 172, first valve system 172 may be configured to vary a proportion of fuel supplied to fuel pump 140 from each of the fuel mixture tank and the first separated fuel tank. A control system 112 may be communicatively coupled with first valve system 172 as depicted schematically in FIG. 1 by the broken line. Control system 112 may be configured to vary a setting of first valve system 172 in order to vary the proportion of fuel supplied to the fuel pump inlet passage 184 (and hence to fuel pump 140) from each of the fuel mixture tank and the first separated fuel tank. In this way, a composition of fuel supplied to fuel pump 140 may be varied by control system 112 via first valve system 172 as will be described in greater detail with reference to the process flow of FIG. 3A.

A second valve system 174 may fluidly couple fuel pump 140 to fuel separator 150. For example, second valve system 174 may be disposed between a fuel pump outlet passage 186 of fuel pump 140 and a fuel separator inlet passage 188 communicating with fuel separator 150. Second valve system 174 may also fluidly couple fuel pump outlet passage 186 to a first fuel inlet passage 190 of the engine. For example, second valve system 174 may be disposed between fuel pump outlet passage 186 and first fuel inlet passage 190 communicating with engine 110. As a non-limiting example, first fuel inlet passage 190 may supply fuel to a first injector group of the engine. This first injector group may correspond to one or more direct fuel injectors of the engine cylinders as will be described with reference to direct fuel injector 250 of FIG. 2.

Second valve system 174 may comprise one or more adjustable fuel control valves. As a non-limiting example, second valve system 174 may comprise a three-way fuel control valve that couples fuel pump outlet passage 186 to fuel separator inlet passage 188 and first fuel inlet passage 190. As another non-limiting example, second valve system 174 may comprise two or more separate or discrete fuel control valves, where a first fuel control valve fluidly couples fuel pump outlet passage 186 to fuel separator inlet passage 188 and a second fuel control valve fluidly couples fuel pump outlet passage 186 to first fuel inlet passage 190. In some embodiments, second valve system 174 may comprise a spool valve, an example of which is depicted in FIGS. 8A and 8B. First valve system 172 and second valve system 174 may form a common spool valve in some embodiments.

Regardless of the particular configuration of second valve system 174, second valve system 174 may be configured to vary a proportion of fuel supplied to each of the engine and the fuel separator. Control system 112 may be communicatively coupled with second valve system 174 as depicted schematically in FIG. 1 by the broken line. Control system 112 may be configured to vary a setting of second valve system 174 in order to vary the proportion of fuel supplied from fuel pump outlet passage 186 (hence fuel pump 140) to each of engine 110 and fuel separator 150. In this way, the proportion of the fuel supplied to engine 110 via first fuel inlet passage 190 relative to fuel separator 150 via fuel separator inlet passage 188 may be varied by control system 112 via second valve system 174 as will be described in greater detail with reference to the process flow of FIG. 3A.

Fuel may be received at fuel separator 150 via fuel separator inlet passage 188 where it may be separated into two or more different fuel components. As a non-limiting example, fuel separator 150 may comprise a fuel separation membrane that is configured to selectively pass an alcohol component of the fuel mixture and contain a gasoline component of the fuel mixture. For example, fuel separator 150 may be configured to receive the fuel mixture comprising ethanol and gasoline via fuel separator inlet passage 188 where it may separate the fuel mixture into an ethanol component (i.e. an alcohol rich fuel) and a gasoline component (i.e. a gasoline rich fuel). For example, the ethanol component may be output by the fuel separator via a first fuel separator outlet passage 192 and the gasoline component may be output by the fuel separator via a second fuel separator outlet passage 194.

First fuel separator outlet passage 192 in turn may supply the separated ethanol component to first separated fuel tank 130 where it may be stored for later use by the fuel system. Second fuel separator outlet passage 194 may supply the separated gasoline component to one or more of: engine 110 via second fuel inlet passage 196, fuel mixture tank 120 via fuel return passage 198, and optionally to second separated fuel tank 160. As a non-limiting example, second fuel inlet passage 196 may supply fuel to a second injector group of the engine. The second injector group may correspond to one or more port fuel injectors as will be described with reference to injector 251 of FIG. 2.

Figure 2:
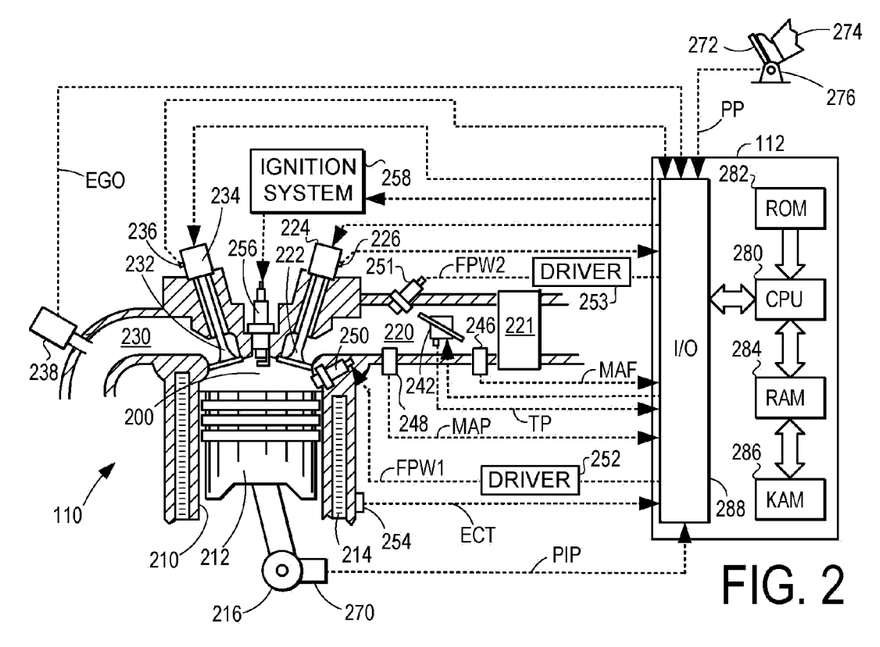
FIG. 2 illustrates an example cylinder of the engine of FIG. 1.

FIG. 2 illustrates a schematic depiction of an example cylinder 200 of engine 110 including intake and exhaust system components that interface with the cylinder. Note that cylinder 200 may correspond to one of a plurality of cylinders of engine 110. Cylinder 200 is at least partially defined by combustion chamber walls 210 and piston 212. Piston 212 may be coupled to a crankshaft 216 via a crank arm, along with other pistons of the engine. Crankshaft 216 may be operatively coupled with one or more drive wheels of the vehicle.

Cylinder 200 may receive intake air via an intake passage 220. Intake passage 220 may also communicate with other cylinders of engine 110. Intake passage 220 may include a throttle 242 including a throttle plate that may be adjusted by control system 112 to vary the flow of intake air that is provided to the engine cylinders. Throttle 242 may be adjusted by control system 112 to vary the engine load and engine torque. Cylinder 200 may communicate with intake passage 220 via one or more intake valves 222. Cylinder 200 may exhaust products of combustion via an exhaust passage 230. Cylinder 200 can communicate with exhaust passage 230 via one or more exhaust valves 232.

In some embodiments, cylinder 200 may optionally include a spark plug 256, which may be actuated by an ignition system 258. A first fuel injector 250 of the first injector group may be configured as a direct fuel injector and may be operated to deliver fuel directly to cylinder 200. A second fuel injector 251 of the second injector group may be configured as a port fuel injector and may be operated to deliver fuel to intake passage 220 of cylinder 200.

A non-limiting example of control system 112 is depicted schematically in FIG. 2. Control system 112 may include a processing subsystem (CPU) 280, which may include one or more processors. CPU 280 may communicate with memory, including one or more of read-only memory (ROM) 282, random-access memory (RAM) 284, and keep-alive memory (KAM) 286. Storage medium read-only memory 282 can be programmed with computer readable data representing instructions executable by processing subsystem 280 for performing the methods and process flows described herein as well as other variants that are anticipated but not specifically listed.

CPU 280 can communicate with various sensors and actuators of engine 110 via an input/output device 288. As a non-limiting example, these sensors may provide operating condition information to the control system, and may include: an indication of mass airflow (MAF) through intake passage 220 via sensor 246, an indication of manifold air pressure (MAP) via sensor 248, an indication of throttle position (TP) via throttle 242, an indication of engine coolant temperature (ECT) via sensor 254 which may communicate with coolant passage 214, an indication of engine speed (PIP) via sensor 270, an indication of exhaust gas oxygen content (EGO) via sensor 238, an indication of a requested engine torque and/or speed (PP) from vehicle operator 274 via position sensor 276 of pedal 272, an indication of intake valve position via sensor 226, and an indication of exhaust valve position via sensor 236, among others.

Furthermore, the control system may control operation of the engine 110, including cylinder 200 via one or more of the following actuators: driver 252 to vary fuel injection timing and quantity of fuel injector 250, driver 253 to vary fuel injection timing and quantity of fuel injector 251, ignition system 258 to vary spark timing, intake valve actuator 224 to vary intake valve timing, exhaust valve actuator 234 to vary exhaust valve timing, and throttle 242 to vary the position of the throttle plate, among others. Note that intake and exhaust valve actuators 224 and 234 may include electromagnetic valve actuators (EVA) and/or cam-follower based actuators.

Figure 3A:
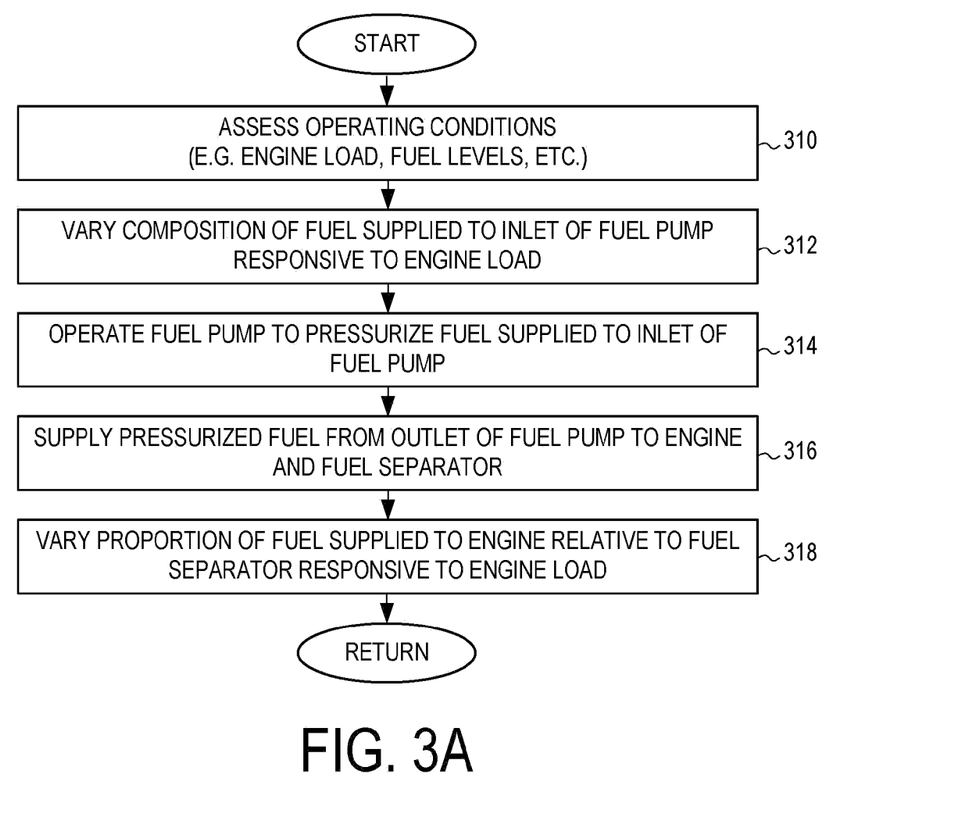
FIGS. 3A, 3B, and 4 illustrate example process flows that may be used to control the fuel systems described herein.

FIG. 3A illustrates an example process flow for controlling first valve system 172 and second valve system 174 responsive to operating conditions. The process flow of FIG. 3A may be performed by control system 112 in some embodiments. At 310, one or more operating conditions may be assessed. For example, control system 112 may assess operating conditions identified by one or more sensors associated with engine 110, fuel mixture tank 120, first separated fuel tank 130, second separated fuel storage tank 160, fuel pump 140, first valve system 172, second valve system 174, fuel separator 150, etc. As a non-limiting example, these operating conditions may include one or more of: engine output (e.g. load or torque), engine speed, a level of fuel stored at fuel mixture tank 120, a level of fuel stored at first separated fuel tank 130, a level of fuel stored at second separated fuel tank 160, a selected setting of first valve system 172, a selected setting of second valve system 174, an indication of engine knock, and various temperatures (e.g. one or more of engine coolant temperature, exhaust temperature, ambient air temperature), among others.

At 312, the composition of fuel supplied to fuel pump inlet 184 (and hence to fuel pump 140) may be varied responsive to the engine output (e.g. load assessed at 310). As a non-limiting example, the control system may adjust first valve system 172 to increase the concentration of alcohol (e.g. ethanol) in the fuel supplied to fuel pump inlet 184 responsive to a higher engine load and may reduce the concentration of alcohol in the fuel supplied to fuel pump inlet 194 responsive to a lower engine load. In other words, at higher engine load the control system may reduce the contribution of lower alcohol concentration fuel supplied from fuel mixture tank 120 to fuel pump 140 via first valve system 172 relative to higher alcohol concentration fuel supplied from first separated fuel tank 130. Conversely, at lower engine load the control system may increase the contribution of lower alcohol concentration fuel supplied from fuel mixture tank 120 to fuel pump 140 via first valve system 172 relative to higher alcohol concentration fuel supplied from first separated fuel tank 130. Thus, the heat of vaporization of the fuel supplied to the inlet of the fuel pump may be increased responsive to a first operating condition (e.g. higher engine output), and a heat of vaporization of the fuel supplied to the inlet of the fuel pump may be reduced responsive to a second operating condition (e.g. lower engine output). Note that in other embodiments, the heat of vaporization of the fuel may be adjusted by varying other fuel related properties beyond alcohol concentration.

At 314, fuel pump 140 may be operated to pressurize fuel supplied to fuel pump inlet 184. For example, control system 112 may send a pump activation signal or control signal to fuel pump 140 to cause fuel pump 140 to output fuel to fuel pump outlet 186 at a pressure which may be varied responsive to the conditions assessed at 310. At 316, the pressurized fuel may be supplied from fuel pump outlet 186 to one or more of engine 110 and fuel separator 150 via second valve system 174.

At 318, the proportion of fuel supplied from fuel pump 140 to engine 110 relative to fuel separator 150 may be varied responsive to the engine load assessed at 310. For example, responsive to a higher engine load the control system may increase the amount of fuel supplied to the engine via the first injector group relative to the fuel separator by adjusting second valve system 174. Similarly, responsive to a lower engine load the control system may reduce the amount of fuel supplied to the engine via the first injector group relative to the fuel separator by adjusting second valve system 174.

The process flow of FIG. 3A illustrates how second valve system 174 may be operated to provide more fuel from fuel pump 140 to engine 110 via first fuel inlet passage 190 during higher engine loads than during lower engine loads, while also operating first valve system 172 to provide more fuel from first separated fuel tank 130 to fuel pump 140 during higher engine loads than during lower engine loads. The process flow of FIG. 3A also illustrates how second valve system 174 may be operated to provide more fuel from fuel pump 140 to fuel separator 150 via fuel separator inlet passage 188 during lower engine loads than during higher engine loads, while also operating first valve system 172 to provide more of the fuel mixture from fuel mixture tank 120 to fuel pump 140 during lower engine loads than during higher engine loads. In this way, fuel pump 140 may be operated, in at least some examples, to primarily provide fuel having a higher alcohol concentration to engine 110 via a direct fuel injector during higher engine loads and may be operated primarily to provide a fuel mixture to fuel separator 150 for separation during lower engine loads when less knock suppression by the higher alcohol concentration fuel is requested.

Figure 3B:
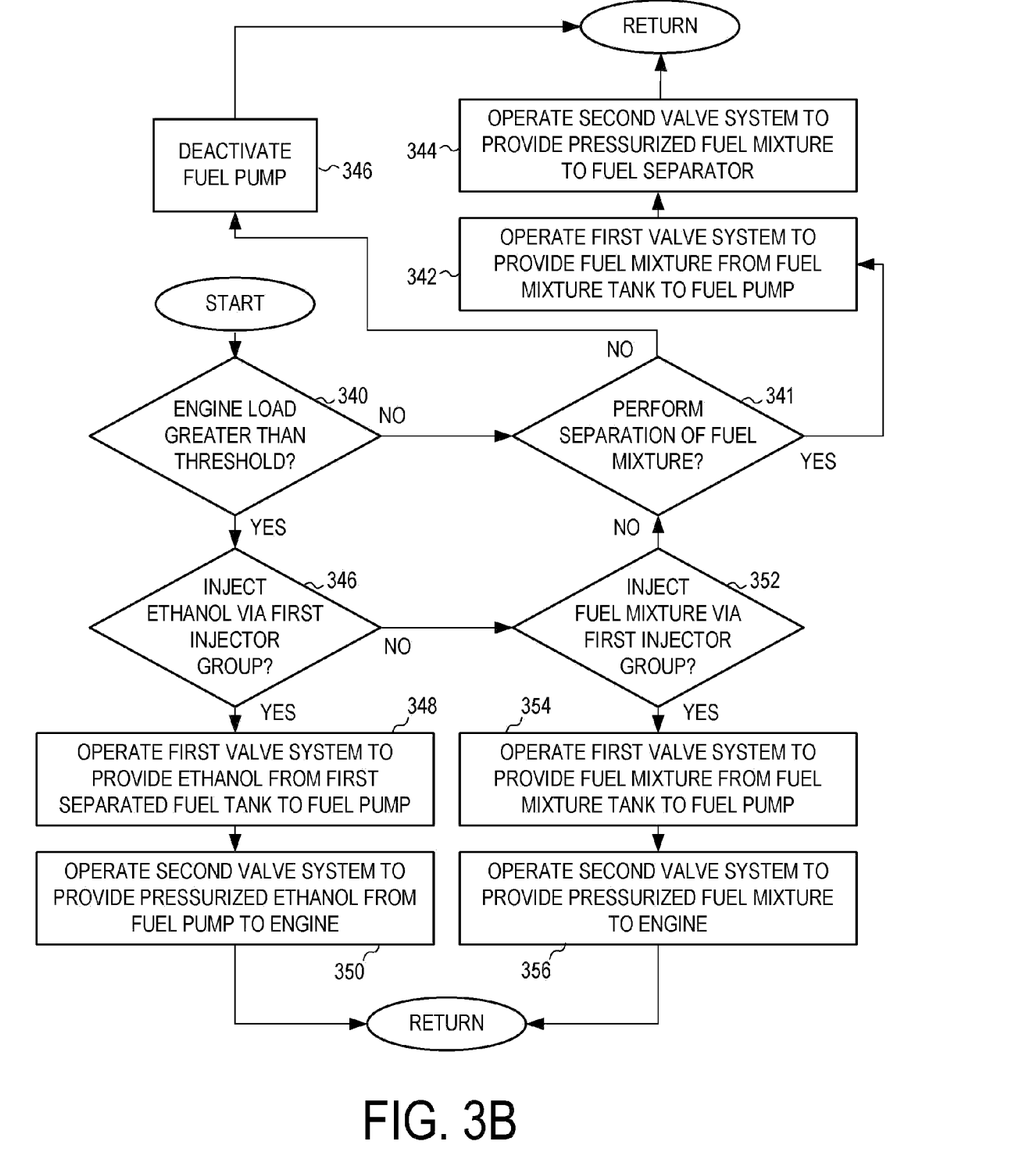
Figure 5:
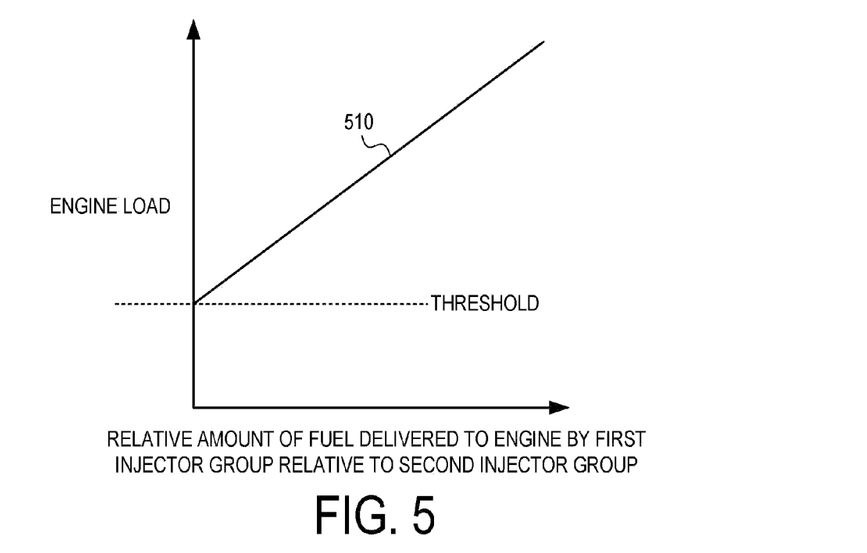
FIG. 5 illustrates an example map for varying relative amounts of fuel delivered to the engine via port fuel injectors and direct fuel injectors responsive to engine output.

FIG. 3B illustrates an example process flow depicting a more specific application of the process flow of FIG. 3A. At 340, it may be judged whether the engine load is greater than a threshold. Referring also to FIG. 5, an example map is illustrated which shows an example threshold that may be utilized by the control system with respect to engine load. Engine load is used as a non-limiting example, and it is understood that the threshold may depend on other parameters such as engine speed, temperature, fuel levels, knock sensor signal, etc. which may also affect the decision to inject fuel with the first injector group. If the answer at 340 is judged no, the process flow may proceed to 341.

At 341, it may be judged whether separation of the fuel mixture is to be performed by the fuel separator. In some embodiments, the control system may be configured to assess the level of fuel stored at first separated fuel tank 130 and/or second separated fuel tank 160. If the level of fuel stored at one or more of tanks 130 and 160 are above a threshold level, the answer at 341 may be judged no and fuel pump 140 may be deactivated at 346. In some embodiments, fuel pump 140 may be powered by an electric motor. As such, at 346, the electric motor may be turned off or the electrical energy supplied to the electric motor may be reduced, thereby conserving energy while direct injection and fuel separation are not being performed. In other embodiments, fuel pump 140 may be mechanically driven by the engine, and may be deactivated with a fluid bypass and/or mechanical clutch, which may also conserve energy while direct injection and fuel separation are not being performed.

Alternatively, if the answer at 341 is yes (i.e. separation of the fuel mixture is to be performed), the process flow may proceed to 342. At 342, first valve system 172 may be operated to provide the fuel mixture from the fuel mixture tank to fuel pump 140. In some embodiments, the first valve system may be operated at 342 to inhibit or reduce the alcohol rich fuel (e.g. ethanol) stored at first separated fuel tank 130 from flowing to fuel pump 140. At 344, the second valve system may be operated to provide the pressurized fuel mixture from fuel pump 140 to the fuel separator. In some embodiments, the second valve system may be operated at 344 to inhibit or reduce the pressurized fuel mixture from being supplied to the first injector group of the engine via first fuel inlet passage 190. In some embodiments, the output pressure of fuel pump 140 may be adjusted at 344 to a level appropriate for fuel separator 150. In this way, at engine loads below the threshold, the first and second valve systems may be adjusted at 342 and 344 to provide the fuel mixture to the fuel separator for separation into an alcohol rich component, which may be supplied to first separated fuel tank 130 and a gasoline rich component, which may be supplied to one or more of the engine, second separated fuel tank, or returned to the fuel mixture tank.

If the answer at 340 is alternatively judged yes (i.e. the engine load is greater than the threshold), the process flow may proceed to 346. At 346, it may be judged whether to inject the alcohol rich fuel (e.g. ethanol) at the engine via the first injector group. As one example, the decision at 346 may be judged no if the separated ethanol is not available at first separated fuel tank 130 or if the alcohol rich fuel is available at less than a prescribed level. As another example, the decision at 346 may be judged in response to engine load. For example, referring to FIGS. 4 and 5, the control system may perform the process flow of FIG. 4 in accordance with the map of FIG. 5 to determine whether the alcohol rich fuel including ethanol is to be injected at the engine via the first injector group based on engine load determinations and/or other parameters such as engine speed, temperature, knock sensor signal, etc.

Figure 4:
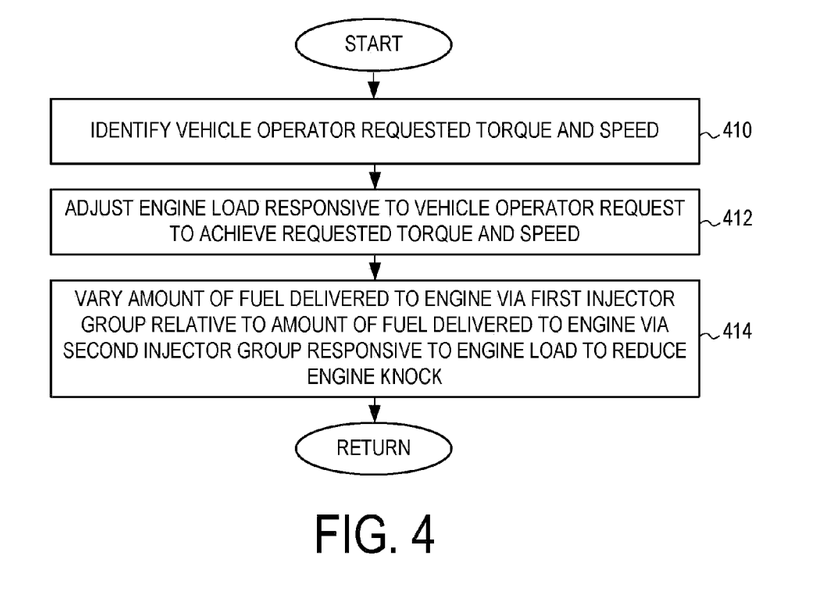

At 410 of FIG. 4, a vehicle operator requested torque and speed may be identified. As a non-limiting example, the control system may identify the vehicle operator request from an accelerator pedal position sensor as depicted at 276 in FIG. 2. At 412, the engine load may be adjusted responsive to the vehicle operator request identified at 410 in order to achieve the requested torque and speed. As a non-limiting example, in response to a requested increase in engine torque, the control system may open an air intake throttle, increase boost pressure provided by a boosting device, and/or adjust intake or exhaust valve timing in order to increase engine load. Conversely, in response to a requested decrease in engine torque, the control system may reduce an opening of the air intake throttle, reduce boost pressure provided by a boosting device, and/or adjust intake or exhaust valve timing in order to reduce engine load.

At 414, the amount of fuel delivered to the engine via the first injector group (including one or more direct fuel injectors) may be varied relative to the amount of fuel delivered to the engine via the second injector group (including one or more port fuel injectors) responsive to the engine load in order to reduce engine knock. FIG. 5 provides a non-limiting example of how an amount of fuel delivered to the engine by the first injector group may be increased relative to an amount of fuel delivered to the engine by the second injector group as the engine load increases above the threshold. Engine load is used in FIGS. 4 and 5 as a non-limiting example, and it is understood that other parameters such as engine speed, temperature, fuel levels, knock sensor signal, etc. may also affect the amount of fuel injected with the first injector group relative to the second injector group.

For example, where the first injector group includes one or more direct fuel injectors and the second injector group includes one or more port fuel injectors, the control system may increase the amount of ethanol injected directly into the engine cylinders via the first injector group relative to the amount of gasoline that is injected into the intake port via the second injector group as the engine load increases. Conversely, the control system may reduce the amount of ethanol injected directly into the engine cylinders via the first injector group relative to the amount of gasoline injected into the intake port via the second injector group as the engine load decreases. In some embodiments, the first injector group may not inject fuel, including ethanol, into the engine when the engine load is below the threshold as shown in FIG. 5.

Returning to FIG. 3B, at 346, if it is judged that the alcohol rich fuel, including the separated ethanol is to be injected into the engine via the first injector group, the process flow may proceed to 348. At 348, first valve system 172 may be operated to provide the alcohol rich fuel, including the separated ethanol from first separated fuel tank 130 to fuel pump 140. In some embodiments, first valve system 172 may be operated to inhibit or reduce the flow of the fuel mixture from fuel mixture tank 120 to fuel pump 140. At 350, the second valve system may be operated to provide pressurized ethanol from the fuel pump to the first injector group of the engine via first inlet passage 190. In some embodiments, the second valve system may be operated to inhibit or reduce the flow of ethanol from fuel pump 140 to fuel separator 150. In this way, at higher engine loads, ethanol may be supplied to the engine from the first separated fuel tank, where the first injector group may be operated to inject ethanol directly into the engine cylinders to thereby reduce engine knock.

Alternatively, if the answer at 346 is judged no (i.e. separated ethanol is not to be injected at first injector group), the process flow may proceed to 352. At 352, it may be judged whether the fuel mixture may be injected at the engine via the first injector group. If the answer at 352 is judged no, the process flow may proceed to 341. If the answer at 352 is alternatively judged yes, the process flow may proceed to 354. In some embodiments, direct injection of the fuel mixture may be performed via the first injector group when separated ethanol is not available for injection, for example, if the level of the alcohol rich fuel stored at first separated fuel tank 130 is less than a threshold level. Since the fuel mixture may include at least some ethanol, charge cooling affects may still be achieved by direct injection of the fuel mixture, even when separated ethanol is not available. Furthermore, direct injection of gasoline may provide greater charge cooling than port injection of gasoline. As such, even when the fuel mixture includes a substantially low concentration of alcohol or no alcohol, charge cooling may still be achieved at higher engine loads by direct injection of the fuel mixture (even consisting of pure gasoline) via the first injector group.

At 354, the first valve system may be operated to provide the fuel mixture from the fuel mixture tank 120 to fuel pump 140 where it may be pressurized. In some embodiments, the first valve system may be operated to inhibit or reduce the flow of ethanol from the first separated fuel tank 130 to fuel pump 140. At 356, the second valve system may be operated to provide the fuel mixture pressurized at fuel pump 140 to the engine via the first injector group. In this way, the fuel mixture may be injected directly into the engine cylinders to provide at least some charge cooling at higher engine loads, thereby reducing engine knock.

In some embodiments, control system 112 may be configured to delay adjusting second valve system 174 after first valve system 172 has been adjusted in order to purge a previous fuel from fuel pump 140 and fuel pump outlet passage 186 before a new fuel is introduced to the fuel separator or engine. For example, at 342, the first valve system may be operated to provide the fuel mixture from the fuel mixture tank to fuel pump 140. The second valve system may be operated at 344 to provide the pressurized fuel mixture to the fuel separator only after a prescribed period of time has passed since the first valve system has been operated at 342. Similarly, the operation at 350 and 356 may be delayed after respective operations 348 and 354 are performed in order to purge fuel pump 140 and fuel pump outlet passage 186.

In some embodiments, control system 112 may utilize feedback received from a fuel composition sensor 187 arranged downstream of fuel pump 140 in order to schedule adjustment of second valve system 174 after first valve system 172 has been adjusted. For example, where ethanol is initially supplied to a direct fuel injector of the engine via fuel pump 140 and the first valve system is adjusted to at 342 to supply the fuel mixture to the fuel pump, the control system may adjust the second valve system at 344 when the concentration of ethanol contained in the fuel identified by the fuel composition sensor approaches the fuel mixture or attains a prescribed fuel composition, thereby indicating that the ethanol has been purged from the fuel pump. A similar approach may be applied to operations 350 and 356 in response to feedback from the fuel composition sensor.

Figure 6:
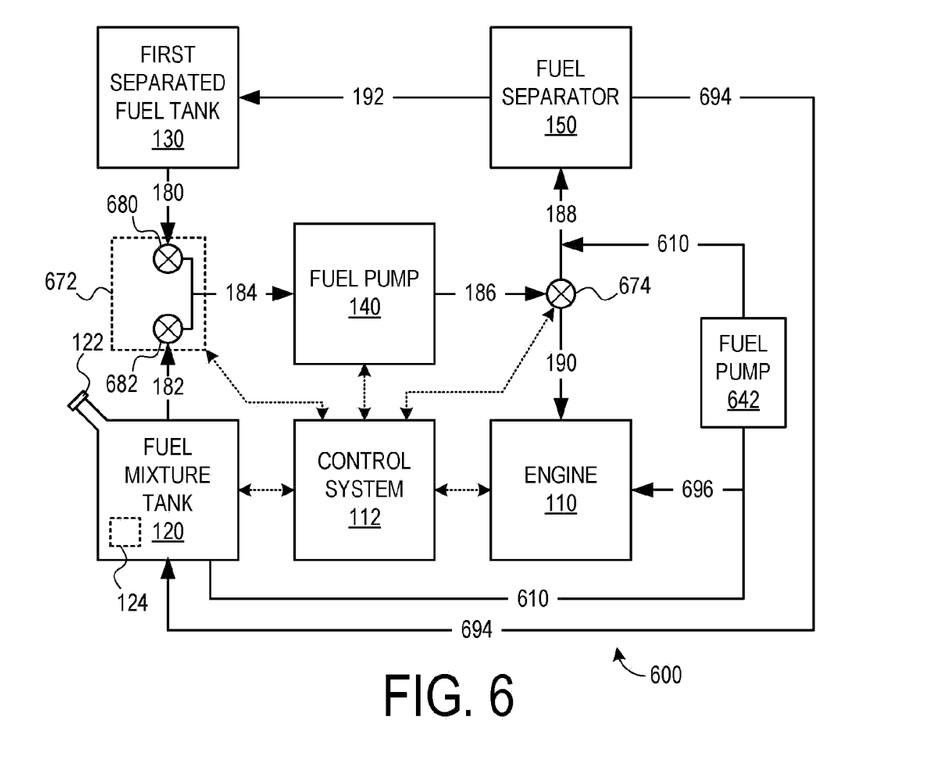
FIGS. 6 and 7 illustrate alternative embodiments of the fuel system of FIG. 1.
Figure 7:
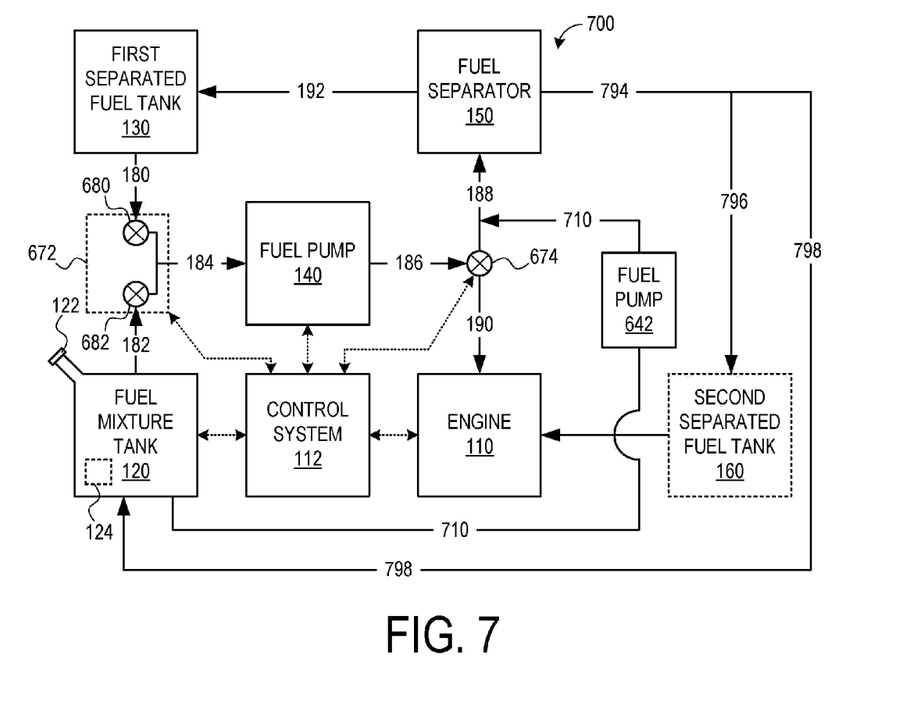
Figure 8A:
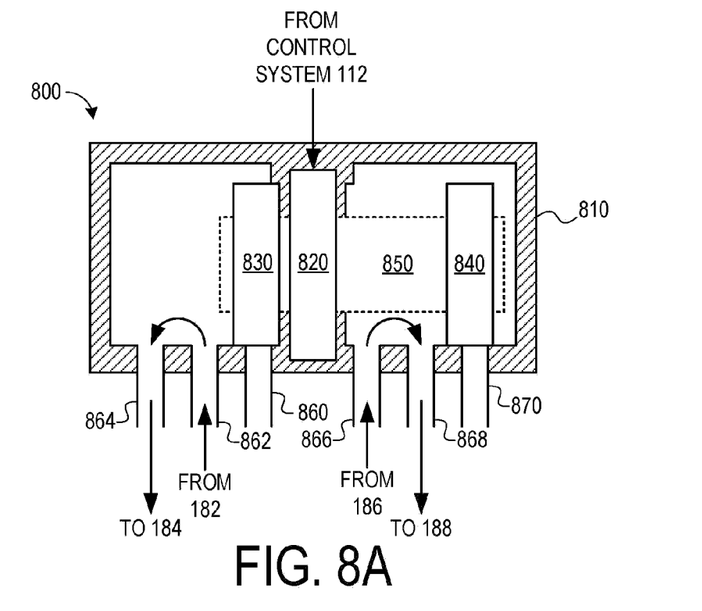
FIGS. 8A and 8B illustrate an example spool valve.
Figure 8B:
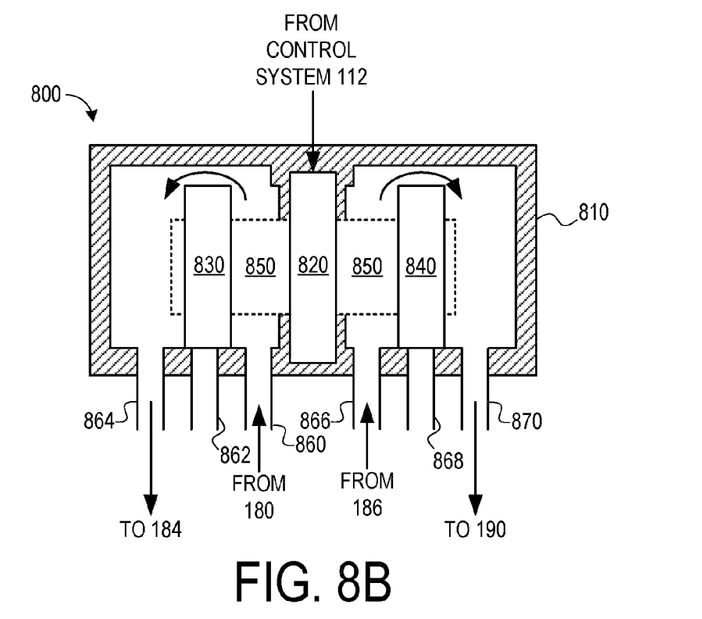

FIGS. 6 and 7 provide alternative examples of fuel system 100 of FIG. 1. Referring to FIG. 6, an example fuel system 600 is shown. Fuel system 600 may include many of the same components as fuel system 100. First valve system 672 may refer to first fuel system 172 of FIG. 1. However, in this particular embodiment, first valve system 672 comprises a first fuel control valve 680 configured to vary the flow rate of fuel from first separated fuel tank 130 to fuel pump 140. As previously described, this fuel may comprise alcohol such as ethanol. First valve system 672 further comprises a second fuel control valve 682 configured to vary the flow rate of the fuel mixture from fuel mixture tank 120 to fuel pump 140. In this way, first valve system 672 may be operated to vary the amount of ethanol supplied to fuel pump 140 relative to the amount of fuel mixture supplied to fuel pump 140.

Second valve system 674 may refer to second valve system 174. In the embodiment of fuel system 600, second valve system 674 may comprise a single three-way valve. However, in other embodiments second valve system 674 may comprise two or more valves, for example, as described with reference to first valve system 672. Furthermore, in the embodiment of fuel system 600, the gasoline component that is separated from the fuel mixture at fuel separator 150 may be returned to fuel mixture tank 120 via return passage 694. The fuel mixture may also be supplied to the second injector group of the engine via fuel passages 610 and 696. Fuel passage 610 may optionally include an additional fuel pump 642 that may be operated to pressurize the fuel mixture supplied from fuel mixture tank 120. Fuel passage 610 may communicate with fuel separator inlet passage 188.

As a non-limiting example, where fuel system 600 is operated according to operations 348 and 350 of FIG. 3B, the fuel mixture may be supplied to the fuel separator via fuel passage 610 and fuel pump 642, while valve 682 may be closed to inhibit flow of the fuel mixture to fuel pump 140. Furthermore, valve 674 may be operated to inhibit ethanol from flowing from fuel pump outlet passage 186 to fuel separator inlet passage 188. Thus, while fuel pump 140 is operated to supply pressurized ethanol to the first injector group of engine 110, fuel pump 642 may be operated to supply the pressurized fuel mixture to fuel separator 150. In this way, substantial fuel separation may be performed at fuel separator 150 even while ethanol is delivered to the engine via the first injector group.

Referring to FIG. 7, an example fuel system 700 is shown. Fuel system 700 may include many of the same components as FIGS. 1 and 6. In the embodiment of fuel system 700, the gasoline component that is separated from the fuel mixture at fuel separator 150 may be supplied to passage 794, which includes a first branch passage 796 and a second branch passage 798. First branch passage 796 may communicate with engine 110 via the second injector group. In some embodiments, first branch passage 796 may optionally include second separated fuel tank 160. Second separated fuel tank 160 may serve as a fuel buffer for the separated gasoline component before it is delivered to engine 110. Second branch passage 798 may be configured to return the separated gasoline component to fuel mixture tank 120. In some embodiments, a third valve system may be provided at the junction of passage 794, first branch passage 796, and second branch passage 798 to vary the relative amount of separated gasoline that is supplied to each of the first and second branch passages.

The fuel mixture may be provided to fuel separator 150 via fuel passage 710. Fuel passage 710 may optionally include fuel pump 642. Fuel pump 642 may be operated to enable separation of the fuel mixture at fuel separator 150 even when ethanol is supplied to the engine via fuel pump 140. In this way, both fuel separation and direct injection of ethanol may be concurrently performed with fuel system 700, at least during some conditions.

FIGS. 8A and 8B illustrate an example spool valve 800. Spool valve 800 may incorporate the previously described first valve system 172 and second valve system 174 into a common valve system. As a non-limiting example, spool valve 800 may include a valve body 810, which houses an actuator 820. Actuator 820 may be an electromagnetic solenoid type actuator in some embodiments. In some embodiments, actuator 820 may be hydraulically or pneumatically actuated. Actuator 820 can receive control signals from control system 112, which cause actuator 820 to move arm 850 between two or more different positions.

FIG. 8A depicts arm 850 disposed in a first position and FIG. 8B depicts arm 850 disposed in a second position. Arm 850 may include a first flow diverter 830 and a second flow diverter 840. As arm 850 is moved to the position shown in FIG. 8A, fuel may be received from first fuel supply passage 182 at port 862 where it may be directed to fuel pump inlet passage 184 via port 864, and fuel may be received from fuel pump outlet passage 186 via port 866 where it may be directed to fuel separator inlet passage 188 via port 868. Furthermore, as shown in FIG. 8A, first flow diverter 830 may inhibit or reduce fuel flow to fuel pump 140 from second fuel supply passage 180 via port 860, and second flow diverter 840 may inhibit or reduce fuel flow from fuel pump 140 to the first fuel inlet passage 190 of the engine via port 870.

As arm 850 is moved to the position shown in FIG. 8B, fuel may be received from second fuel supply passage 180 at port 860 where it may be direct to fuel pump inlet passage 184 via port 864, and fuel may be received from fuel pump outlet passage 186 via port 866 where it may be directed to first fuel inlet passage 190 via port 870. Furthermore, as shown in FIG. 8B, first flow diverter 830 may inhibit or reduce fuel flow to fuel pump 140 from first fuel supply passage 182 via port 862, and second flow diverter 840 may inhibit or reduce fuel flow to fuel separator inlet passage 188 via port 868.

As previously described with reference to the process flow of FIGS. 3A, 3B, and 4, the fuel flow setting depicted by FIG. 8A may be selected at a lower engine load condition than the fuel flow setting depicted by FIG. 8B. In this way, the control system may cause actuator 820 to move arm 850 between the positions of FIG. 8A and FIG. 8B responsive to engine load, speed, temperatures, fuel levels, knock sensor signal, etc. to thereby affect the fuel delivery approaches described herein. It should be appreciated that FIGS. 8A and 8B depict a non-limiting example of a spool valve, and that different spool valves or other suitable valves may be alternatively used.

Note that the process flows included herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a fuel system comprising:
   operating a fuel pump to provide pressurized fuel to a valve positioned upstream of a fuel separator and an engine;
   supplying the pressurized fuel from the valve to the fuel separator and the engine; and
   varying a proportion of the pressurized fuel supplied to the engine relative to the fuel separator in response to engine operating conditions via the valve.

2. The method of claim 1, where a first outlet of the valve directs the pressurized fuel from the fuel pump to the fuel separator, and where a second outlet of the valve directs the pressurized fuel from the fuel pump to the engine, and further comprising:
   varying a composition of fuel received at an inlet of the fuel pump via a valve positioned upstream of the fuel pump in response to the engine operating conditions.

3. The method of claim 2, where the engine operating conditions include engine output; and where varying the composition of fuel includes: increasing a heat of vaporization of the fuel received at the supplied to the inlet of the fuel pump responsive to a higher engine output, and reducing a heat of vaporization of the fuel received at supplied to the inlet of the fuel pump responsive to a lower engine output.

4. The method of claim 3, where varying the proportion of the pressurized fuel includes: increasing an amount of the pressurized fuel supplied to the engine relative to an amount of the pressurized fuel supplied to the fuel separator responsive to the higher engine output, and reducing the amount of the pressurized fuel supplied to the engine relative to the amount of the pressurized fuel supplied to the fuel separator responsive to the lower engine output.

5. The method of claim 2, where varying the composition of fuel supplied to the inlet of the fuel pump includes: supplying an ethanol-rich fuel to the inlet of the fuel pump from an ethanol-rich fuel tank during operation of the engine at a higher engine output, and supplying a fuel mixture from a fuel mixture tank to the inlet of the fuel pump during a lower engine output, the fuel mixture comprising a blend of ethanol and gasoline; and
where varying the proportion of the pressurized fuel supplied to the engine relative to the fuel separator includes: supplying the ethanol-rich fuel from the ethanol-rich fuel tank to the engine via the fuel pump and a direct fuel injector during operation of the engine at the higher engine output, and supplying the fuel mixture to the fuel separator via the fuel pump during operation of the engine at the lower engine output.

6. The method of claim 2, further comprising, operating the fuel separator to separate the pressurized fuel supplied to the fuel separator from the fuel pump into an alcohol rich component and a gasoline rich component.

7. The method of claim 6, where supplying the pressurized fuel from the second outlet of the fuel pump to the engine includes injecting the pressurized fuel including the alcohol rich component directly into a cylinder of the engine via a direct fuel injector.

8. The method of claim 7, further comprising, supplying the gasoline rich component to the engine by injecting the gasoline rich component into an intake port of the engine via a port fuel injector.

9. A fuel system for an engine, comprising:
a first fuel injector configured to deliver fuel to the engine;
a fuel pump including a fuel pump inlet and a fuel pump outlet;
a fuel mixture tank;
a first separated fuel tank;
a first valve system fluidly coupling the fuel mixture tank to the fuel pump inlet and fluidly coupling the first separated fuel tank to the fuel pump inlet, the first valve system configured to vary a proportion of fuel supplied to the fuel pump from each of the fuel mixture tank and the first separated fuel tank;
a fuel separator including a fuel separator inlet, a first fuel separator outlet, and a second fuel separator outlet, the first fuel separator outlet fluidly coupled to the first separated fuel tank;
a second valve system fluidly coupling the fuel pump outlet to the fuel separator inlet and fluidly coupling the fuel pump outlet to the first fuel injector of the engine, the second valve system configured to vary a proportion of fuel supplied from the fuel pump to each of the first fuel injector and the fuel separator; and a control system configured to:
responsive to a lower engine output, adjust the first valve system to increase the proportion of fuel supplied to the fuel pump from the fuel mixture tank relative to the first separated fuel tank, and adjust the second valve system to reduce the proportion of fuel supplied from the fuel pump to the first fuel injector relative to the fuel separator; and
responsive to a higher engine output, adjust the first valve system to reduce the proportion of fuel supplied to the fuel pump from the fuel mixture tank relative to the first separated fuel tank, and adjust the second valve system to increase the proportion of fuel supplied from the fuel pump to the first fuel injector relative to the fuel separator.

10. The fuel system of claim 9, further comprising:
a second fuel injector configured to deliver fuel to the engine, where the second fuel injector is fluidly coupled with the second fuel separator outlet of the fuel separator, and where the second fuel injector includes a port fuel injector; and
where the first fuel injector includes a direct fuel injector.

11. The fuel system of claim 10, further comprising, a second separated fuel tank; where the second fuel injector is fluidly coupled with the second fuel separator outlet via the second separated fuel tank.

12. The fuel system of claim 10, where the control system is further configured to:
increase an amount of fuel delivered to the engine via the direct fuel injector relative to an amount of fuel delivered to the engine via the port fuel injector responsive to an increase in engine output; and
reduce the amount of fuel delivered to the engine via the direct fuel injector relative to an amount of fuel delivered to the engine via the port fuel injector responsive to a decrease in engine output.

13. The fuel system of claim 9, where the second fuel separator outlet is fluidly coupled to the fuel mixture tank via a fuel return passage.

14. A method of operating a fuel system for an engine, the method comprising:
supplying a first fuel to the engine via a first fuel pump and a port fuel injector;
during a lower engine load range, adjusting a valve system to vary fuel composition at an inlet of a second fuel pump to supply a second fuel to a fuel separator, the second fuel including a blend of gasoline and ethanol and different from the first fuel;
during a higher engine load range, adjusting the valve system to vary fuel composition at the inlet of the second fuel pump to supply a third fuel to the engine via a direct fuel injector, the third fuel including a greater concentration of ethanol than the first fuel and the second fuel; and
adjusting an amount of the third fuel that is supplied to the engine via the direct fuel injector relative to an amount of the first fuel that is supplied to the engine via the port fuel injector as engine load varies within the higher engine load range.

15. The method of claim 14, where the first fuel includes gasoline; and
where the second fuel includes a higher concentration of ethanol than the first fuel.

16. The method of claim 15, further comprising separating the second fuel at the fuel separator into the first fuel and the third fuel.

17. The method of claim 14, where the first fuel includes a same blend of gasoline and ethanol as the second fuel.

18. The method of claim 14, where the second fuel pump includes a fuel pump outlet; and where the outlet of the second fuel pump is fluidly coupled with the direct fuel injector and the fuel separator via an outlet valve system; and where the method further comprises:

setting the outlet valve system to a first position during the lower engine load range so that the second fuel flows to the fuel separator and setting the outlet valve system to a second position during the higher engine load range so that the third fuel flows to the engine via the direct fuel injector.

19. The method of claim 14, where the inlet of the second fuel pump inlet is fluidly coupled with a first fuel tank and a second fuel tank via the valve system; and where the method further comprises:

setting the valve system to a first position during the lower engine load range so that the second fuel flows from the first fuel tank to the second fuel pump and setting the valve system to a second position during the higher engine load range so that the third fuel flows from the second fuel tank to the second fuel pump.

20. The method of claim 14, where adjusting the amount of the third fuel that is supplied to the engine via the direct fuel injector relative to the amount of the first fuel that is supplied to the engine via the port fuel injector as engine load varies within the higher engine load range further includes:

increasing the amount of the third fuel that is supplied to the engine via the direct fuel injector relative to the amount of the first fuel that is supplied to the engine via the port fuel injector as engine load increases within the higher engine load range; and reducing the amount of the third fuel that is supplied to the engine via the direct fuel injector relative to the amount of the first fuel that is supplied to the engine via the port fuel injector as engine load decreases.

\* \* \* \* \*